United States Patent [19]
Recker et al.

[11] Patent Number: 6,029,529
[45] Date of Patent: Feb. 29, 2000

[54] APPARATUS FOR MOUNTING A ROTARY POSITION SENSOR

[75] Inventors: Roger L. Recker, Dunlap; Edward E. Schmillen, Metamora, both of Ill.

[73] Assignee: Caterpillar Inc., Peoria, Ill.

[21] Appl. No.: 09/209,553

[22] Filed: Dec. 11, 1998

[51] Int. Cl.$^7$ .................................................. G01D 7/02
[52] U.S. Cl. ............................................................ 73/866.1
[58] Field of Search ....................... 73/866.1; 324/207.25, 324/723; 74/63, DIG. 7; 338/98, 184, 199

[56] References Cited

U.S. PATENT DOCUMENTS 5,300,918  4/1994  Becker ...................................... 338/196

*Primary Examiner*—Robert Raevis
*Attorney, Agent, or Firm*—Steven D. Lundquist

[57] ABSTRACT

An apparatus for mounting a rotary position sensor to a linkage pin housing and a linkage pin. The linkage pin is rotatably positioned within the linkage pin housing. The apparatus includes a sensor housing adapted to mount to the linkage pin housing, and a linkage pin adapter located within the sensor housing and having a first end adapted to mount to the linkage pin. The linkage pin adapter is adapted to rotate within the sensor housing as a function of a rotation of the linkage pin. The apparatus also includes a first coupling member connected to a second end of the linkage pin adapter. The first coupling member is flexible and has a general cup shape extending away from the linkage pin adapter. In addition, the apparatus includes a second coupling member connected to the first coupling member. The second coupling member is adapted to drivably rotate the rotary position sensor in response to the rotation of the linkage pin.

22 Claims, 2 Drawing Sheets

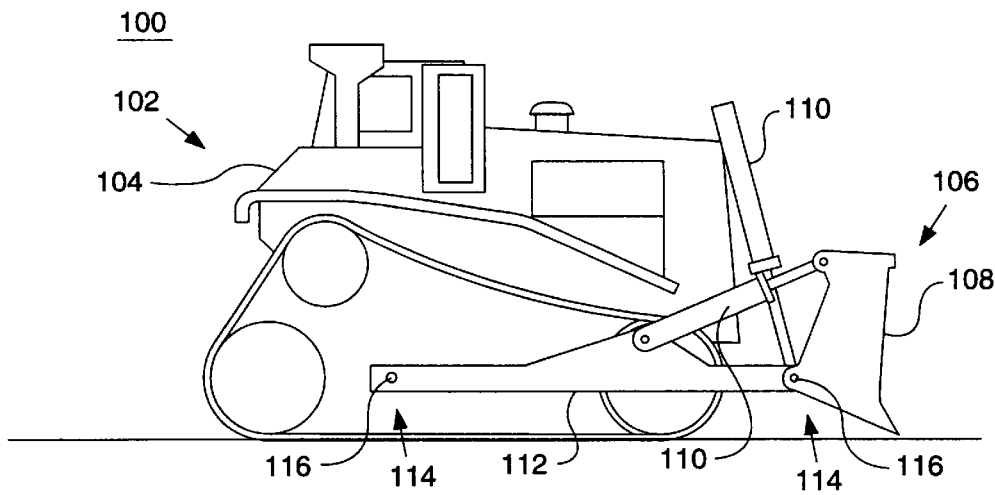
Fig_1_
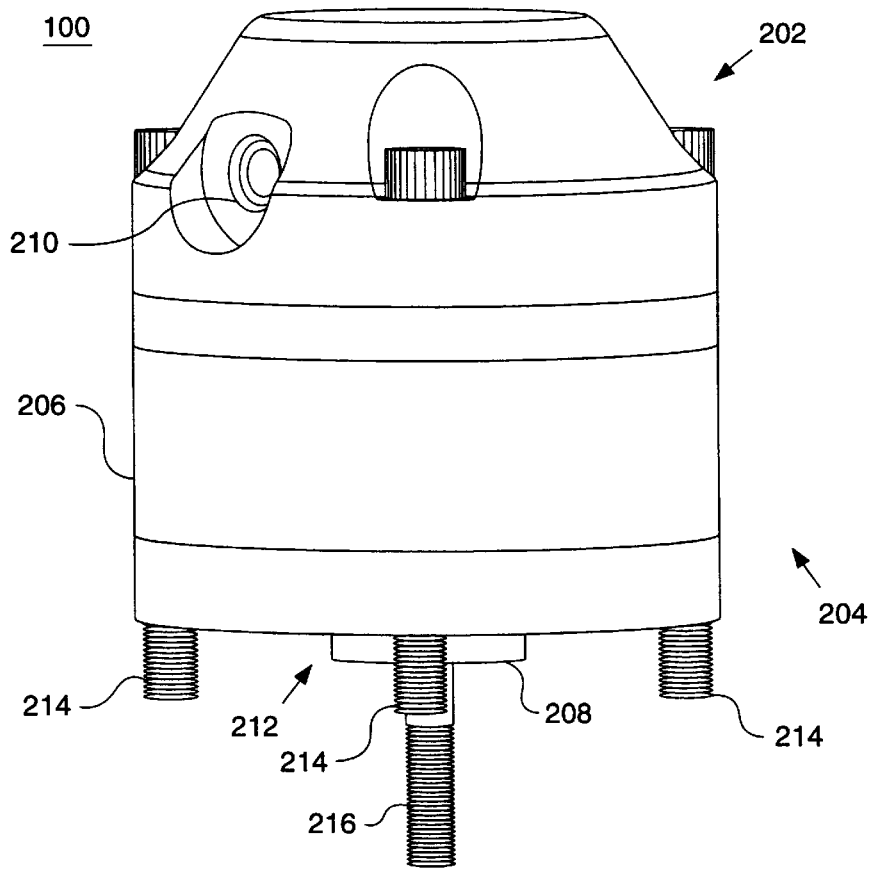
Fig_2_

APPARATUS FOR MOUNTING A ROTARY POSITION SENSOR

TECHNICAL FIELD

This invention relates generally to an apparatus for mounting a rotary position sensor and, more particularly, to an apparatus for isolating a rotary position sensor from undesirable external forces and environmental conditions by use of a fully contained mounting arrangement.

BACKGROUND ART

Work machines, in particular, earthworking machines, perform operations by controllably moving a work implement, such as a bucket or blade, to accomplish the desired function. The work implement is connected to the work machine in a manner that usually allows movement in multiple directions. Movement is normally accomplished by rotation of linkage members about a linkage point.

For example, a track-type tractor controls movement of a blade in several directions. As examples, the blade is lifted and lowered by pivoting a C-frame about a linkage point on the main frame; and the blade is pitched by pivoting a linkage point on the blade with respect to the C-frame.

As another example, an excavator work implement usually consists of a boom, stick, and bucket; each of which moves by rotating about a pivot point with respect to the component it is connected to. For example, the stick moves by pivoting about the linkage point where the stick and the boom are connected together.

It is often desired to monitor the rotating motions and angular displacements of these linkage points to determine the position of the work implement relative to the machine or to the terrain. Several methods for sensing and determining these types of motions are used, including the use of rotary position sensors, commonly known as resolvers. A typical resolver functions by having a first portion attached to a linkage pin, and a second portion attached to the housing surrounding the linkage pin. As the linkage pin rotates relative to the housing, the resolver senses the amount of rotation and provides an electrical signal indicating this value.

In earthworking environments, however, conditions are normally detrimental for sensors of this nature. For example, dust, dirt, mud, rocks, and severe shocks and vibrations are a normal part of earthworking operations. In addition, the unwanted forces acting on the linkage pins, such as radial and axial forces, are communicated to resolvers; thus degrading the accuracy and shortening the life of these sensors.

Attempts have been made to design rotary position sensors which resist the effects of earthworking environments. For example, isolation mounts have been used to mount the sensors to the linkage pin assemblies. However, the isolation mounts themselves are exposed to the elements, and failure of these components is common. In addition, radial and axial forces communicated through to the sensors are a significant factor in contributing to the common failures of the sensors.

The present invention is directed to overcoming one or more of the problems as set forth above.

DISCLOSURE OF THE INVENTION

In one aspect of the present invention an apparatus for mounting a rotary position sensor to a linkage pin housing and a linkage pin is shown. The linkage pin is rotatably positioned within the linkage pin housing. The apparatus includes a sensor housing adapted to mount to the linkage pin housing, and a linkage pin adapter located within the sensor housing and having a first end adapted to mount to the linkage pin. The linkage pin adapter is adapted to rotate within the sensor housing as a function of a rotation of the linkage pin. The apparatus also includes a first coupling member connected to a second end of the linkage pin adapter. The first coupling member is flexible and has a curved outer portion extending away from the linkage pin adapter. In addition, the apparatus includes a second coupling member connected to the curved outer portion of the first coupling member. The second coupling member is adapted to drivably rotate the rotary position sensor in response to the rotation of the linkage pin.

In another aspect of the present invention a rotary position sensor assembly for sensing a rotation of a linkage pin with respect to a linkage pin housing is shown. The assembly includes an outer portion including a sensor housing adapted to mount to the linkage pin housing, and an inner portion contained within the outer portion. The inner portion is sealed within the outer portion and is adapted to mount to the linkage pin such that a rotation of the linkage pin causes a corresponding rotation of the inner portion. The inner portion includes a linkage pin adapter having a first end adapted to mount to the linkage pin, and a first coupling member connected to a second end of the linkage pin adapter. The first coupling member is flexible and has a curved outer portion extending away from the linkage pin adapter. The inner portion also includes a second coupling member connected to the curved outer portion of the first coupling member, and a rotary position sensor connected to the second coupling member. The rotary position sensor is rotatably driven by the second coupling member in response to the rotation of the linkage pin.

BRIEF DESCRIPTION OF THE DRAWINGS

FIG. 1 is a diagrammatic illustration of an earthworking machine commonly embodied for use with the present invention;

FIG. 2 is a diagrammatic illustration of an embodiment of the present invention.

BEST MODE FOR CARRYING OUT THE INVENTION

Figure 3:
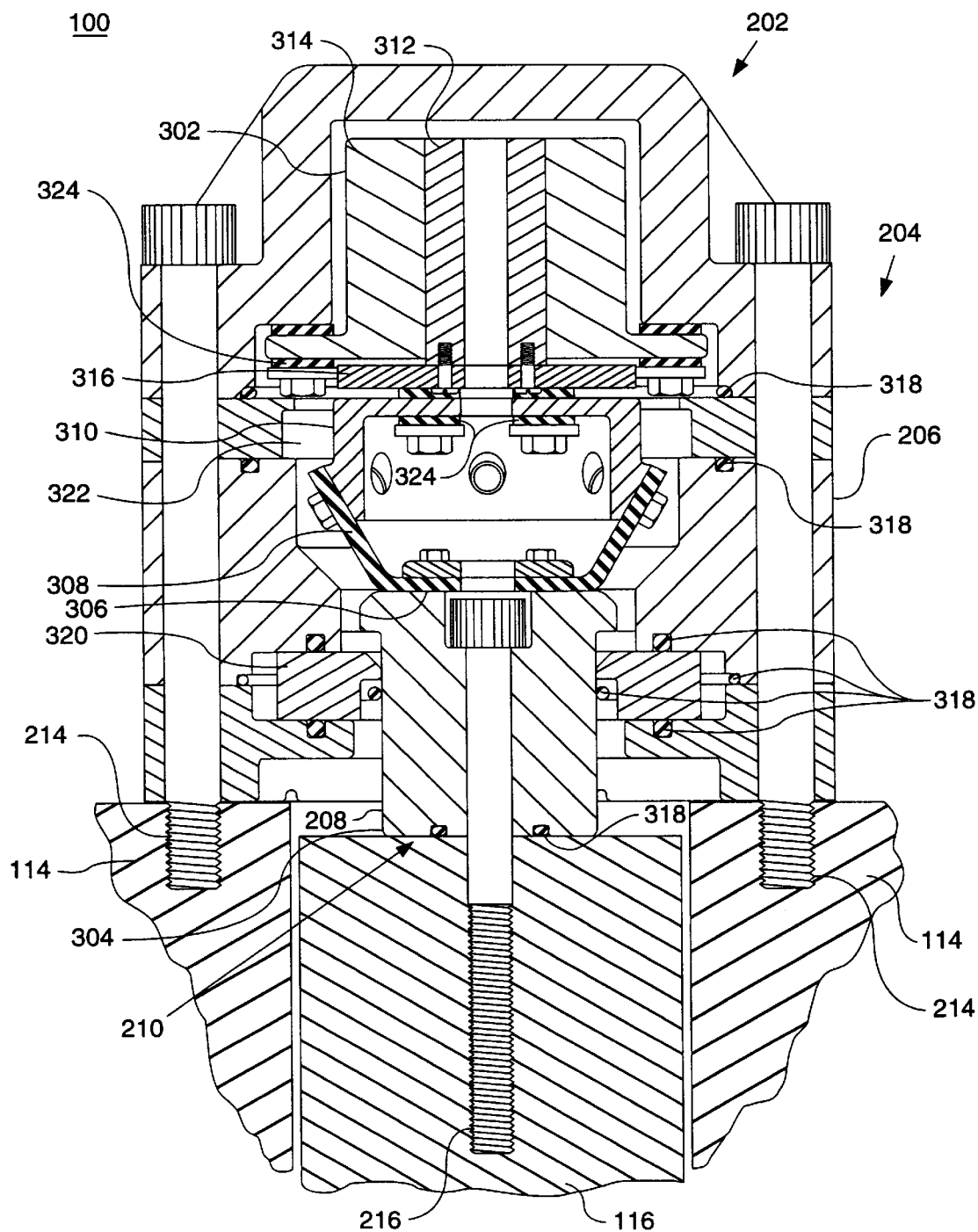
FIG. 3 is a cross sectional view of the embodiment of FIG. 2.

Referring to the drawings, an apparatus 100 for mounting a rotary position sensor 302 to a linkage pin housing 114 and a linkage pin 116 is shown. The linkage pin 116 is positioned for relative rotation with respect to the linkage pin housing 114. Alternatively, the linkage pin housing 114 may rotate with respect to the linkage pin 116.

With particular reference to FIG. 1, a work machine 102 is shown. The work machine 102 depicted, in FIG. 1 and used for exemplary purposes to describe the present invention is a track-type tractor 104. However, other types of work machines, such as excavators, loaders, scrapers, graders, agricultural machines, and the like, could also use the present invention to their benefit.

The work machine 102 uses a work implement 106 to perform work operations. The track-type tractor 104 of FIG. 1 uses a dozer blade 108 to cut and push the earth. Other types of work machines use different work implements, such as buckets, scrapers, hitches, lifting devices, and steering mechanisms.

Preferably, the dozer blade 108 is controllably moved by the use of a plurality of hydraulic cylinders 110. The cylinders 110 extend and retract to cause the dozer blade 108 to move by rotating about a number of pivot points. More specifically, the dozer blade 108 is mounted to a work implement frame 112 by a linkage pin 116, which provides a pivot point between the dozer blade 108 and the work implement frame 112. The linkage pin 116 is securely mounted to the work implement frame 112, and the dozer blade 108 fits onto the linkage pin 116 such that the portion of the dozer blade 108 surrounding the linkage pin 116 acts as a linkage pin housing 114. The linkage pin 116 rotates with respect to the linkage pin housing 114, thus resulting in the dozer blade 108 rotating with respect to the work implement frame 112.

In like manner, the work implement frame 112 is attached to the track-type tractor 104 by another linkage pin 116. Operation of the desired hydraulic cylinders 110 causes the work implement frame 112 to rotate about the linkage pin 116, which in turn causes the dozer blade 108 to raise and lower.

Additional motions of the dozer blade 108 are possible with the use of additional pivot points. However, the above discussion is intended to review principles of operation of a work machine 102 that are well known in the art for the purpose of setting a background for discussion of the present invention. Therefore, additional details of the operation of a work implement 106 with respect to a work machine 102 are not necessary and will not be shown.

Referring now to FIG. 2, a diagrammatic illustration of an embodiment of a rotary position sensor assembly 202 is shown. The rotary position sensor assembly 202 has an outer portion 204, including a sensor housing 206. The sensor housing 206 is adapted to mount to a linkage pin housing 114, preferably using bolts 214. The rotary position sensor assembly 202 is adapted to house the rotary position sensor 302. The outer portion 204 of the rotary position sensor assembly 202 includes a wiring harness outlet 210 to allow the installation of a wiring harness (not shown) for purposes of delivering an electrical signal from the rotary position sensor 302 to a desired location.

An inner portion 212 is contained within the outer portion 204. The inner portion 212 is sealed within the outer portion 204, by methods discussed in detail below, to prevent contamination from the external environment. The inner portion 212 is adapted to mount to a linkage pin 116 such that a rotation of the linkage pin 116 causes a corresponding rotation of the inner portion 212.

Referring to FIG. 3, the inner portion 212 of the rotary position sensor assembly 202 includes a linkage pin adapter 208 located along a longitudinal axis within the sensor housing 206. The linkage pin adapter 208 has a first end 304 which is adapted to mount to the linkage pin 116, preferably with a bolt 216. The linkage pin adapter 208 is adapted to rotate within the sensor housing 206 as a function of the rotation of the linkage pin 116.

A first coupling member 308 is connected to a second end 306 of the linkage pin adapter 208 along the longitudinal axis. The first coupling member 308 is constructed of a flexible material and has a general cup shape which extends away from the linkage pin adapter 208. The flexible material composition of the first coupling member 308 allows the first coupling member 308 to absorb forces in directions, with respect to the longitudinal axis, other than rotary, e.g., radial and axial forces. These forces are then prevented from being communicated to the rotary position sensor 302.

A second coupling member 310 is connected to the first coupling member 308. The second coupling member 310 is connected to the rotary position sensor 302 by an adapter plate 316. The second coupling member 310 is adapted to drivably rotate the rotary position sensor 302 in response to the rotation of the linkage pin 116.

In the preferred embodiment, the rotary position sensor 302 includes two main components. A first portion 312 is cylindrical in shape and is attached to the second coupling member 310 via adapter plate 316. A second portion 314 surrounds the first portion 312 and is attached to the sensor housing 206. The first portion 312 is rotatably movable with respect to the second portion 314 as a function of the rotation of the linkage pin 116. The amount of rotation of the first portion 312 with respect to the second portion 314 correlates to a value of an angle of rotation of the linkage pin 116 with respect to the linkage pin housing 114 and is converted to an electrical signal for delivery to a desired destination in a manner that is well known in the art.

The outer portion 204 of the sensor assembly 202, i.e., the sensor housing 206 includes a plurality of o-rings 318 located at various positions. The o-rings 318 are adapted to seal the inner portion 212 of the rotary position sensor assembly 202 from the external environment. Components within the inner portion 212 include the linkage pin adapter 208, the first coupling member 308, the second coupling member 310, and the rotary position sensor 302.

A circular floating seal disk 320 is located within the sensor housing 206 and around the perimeter of the linkage pin adapter 208. The floating seal disk 320 is adapted to allow the linkage pin adapter 208 to move in a radial direction with respect to the longitudinal axis in response to radial motion of the linkage pin 116. This allowed motion minimizes stresses occurring as a result of radial misalignments between the linkage pin 116 and the rotary position sensor assembly 202.

The flexible first coupling member 308, due to its cup shape, is adapted to flex in response to the radial movements of the linkage pin adapter 208 caused by the misalignments and radial movements of the linkage pin 116. The radial movements are thus prevented from being transferred to the rotary position sensor 302. In addition, the first coupling member 308 is adapted to flex in response to undesired axial movements of the linkage pin 116, which prevents these axial movements from being transferred to the rotary position sensor 302.

A circular bearing 322 is located within the sensor housing 206 between the inner portion 212 and the outer portion 204, and is positioned around the perimeter of the second coupling member 310. The bearing 322 is adapted to prevent radial and axial movements of the second coupling member 310 and therefore the rotary position sensor 302.

A plurality of rubber isolation mounts 324 are located within the sensor housing 206 at locations of attachment of the second coupling member 310 to the rotary position sensor 302 and of the rotary position sensor 302 to the sensor housing 206. The isolation mounts 324 are adapted to isolate the rotary position sensor 302 from shocks and vibrations. The isolation mounts 324, being located in the inner portion 212 of the rotary position sensor assembly 202, are sealed from the external environment. Previously, isolation mounts were used with rotary position sensors at external mounting points of the sensor housing to the work machine 102, thus making them prone to failure from harsh work environments.

INDUSTRIAL APPLICABILITY

As an example of use of the present invention, the rotary position sensor assembly 202 is fully sealed and selfcontained. The sensor assembly 202 has no external shock mounts or external rotating portions, thus protecting all sensitive and moving components from the stresses of an environment proven to be extremely harsh. The rotary position sensor assembly 202 is configured to mount easily to a linkage pin 116 on a work machine 102.

As a work machine 102, such as a track-type tractor 104, performs operations at a work site, the various linkages which control movement of the work implement 106 are monitored by rotary position sensors 302. The angular movements of the linkages are sensed, and the information is delivered to a desired destination for processing and further control of the work implement 106.

Other aspects, objects, and features of the present invention can be obtained from a study of the drawings, the disclosure, and the appended claims.

What is claimed is:

1. An apparatus for mounting a rotary position sensor to a linkage pin housing and a linkage pin, the linkage pin being rotatably positioned within the linkage pin housing, comprising:
    a sensor housing adapted to mount to the linkage pin housing;
    a linkage pin adapter located along a longitudinal axis within the sensor housing and having a first end adapted to mount to the linkage pin, the linkage pin adapter being adapted to rotate within the sensor housing as a function of a rotation of the linkage pin;
    a first coupling member connected to a second end of the linkage pin adapter along the longitudinal axis, the first coupling member being flexible and having a general cup shape extending away from the linkage pin adapter; and
    a second coupling member connected to the first coupling member, the second coupling member being adapted to drivably rotate the rotary position sensor in response to the rotation of the linkage pin.

2. An apparatus, as set forth in claim 1, wherein the rotary position sensor includes:
    a first portion attached to the second coupling member; and
    a second portion attached to the sensor housing, the first portion located within the second portion and being rotatably movable with respect to the second portion as a function of a rotation of the linkage pin.

3. An apparatus, as set forth in claim 2, wherein rotation of the first portion of the rotary position sensor with respect to the second portion is adapted to sense a value of an angle of rotation of the linkage pin with respect to the linkage pin housing.

4. An apparatus, as set forth in claim 3, further including an adapter plate adapted to connect the second coupling member to the first portion of the rotary position sensor.

5. An apparatus, as set forth in claim 1, wherein the sensor housing includes a plurality of o-rings adapted to seal an internal portion of the sensor housing from the external environment.

6. An apparatus, as set forth in claim 5, wherein the inner portion of the sensor housing contains the linkage pin adapter, the first coupling member, the second coupling member, and the rotary position sensor.

7. An apparatus, a set forth in claim 1, further including a circular floating seal disk located within the sensor housing and around the perimeter of the linkage pin adapter, the floating seal disk being adapted to allow the linkage pin adapter to move in a radial direction with respect to the longitudinal axis in response to radial motion of the linkage pin.

8. An apparatus, as set forth in claim 7, wherein the flexible first coupling member is adapted to flex in response to radial movements of the linkage pin adapter and responsively prevent the radial movements from being transferred to the rotary position sensor, the first coupling member also being adapted to prevent axial movements of the linkage pin from being transferred to the rotary position sensor.

9. An apparatus, as set forth in claim 8, further including a circular bearing located within the sensor housing and around the perimeter of the second coupling member, the bearing being adapted to prevent radial and axial movement of the second coupling member and the rotary position sensor.

10. An apparatus, as set forth in claim 1, further including a plurality of rubber isolation mounts located within the sensor housing at locations of attachment of the second coupling member to the rotary position sensor and of the rotary position sensor to the sensor housing.

11. An apparatus, as set forth in claim 10, wherein the isolation mounts are adapted to isolate the rotary position sensor from shocks and vibrations.

12. An apparatus, as set forth in claim 11, wherein the isolation mounts are sealed from the external environment.

13. A rotary position sensor assembly for sensing a rotation of a linkage pin with respect to a linkage pin housing, comprising:
    an outer portion including a sensor housing adapted to mount to the linkage pin housing; and
    an inner portion contained within the outer portion along a longitudinal axis, the inner portion being sealed within the outer portion and being adapted to mount to the linkage pin such that a rotation of the linkage pin causes a corresponding rotation of the inner portion, the inner portion including:
        a linkage pin adapter having a first end adapted to mount to the linkage pin;
        a first coupling member connected to a second end of the linkage pin adapter along the longitudinal axis, the first coupling member being flexible and having a general cup shape extending away from the linkage pin adapter;
    a second coupling member connected to the first coupling member; and
    a rotary position sensor connected to the second coupling member, the rotary position sensor being rotatably driven by the second coupling member in response to the rotation of the linkage pin.

14. A sensor assembly, as set forth in claim 13, wherein the rotary position sensor includes:
    a first portion located in the inner portion of the sensor assembly and attached to the second coupling member; and
    a second portion located in the outer portion of the sensor assembly and attached to the sensor housing, the first portion located within the second portion and being rotatably movable with respect to the second portion as a function of a rotation of the linkage pin.

15. A sensor assembly, as set forth in claim 14, wherein the first portion of the rotary position sensor with respect to the second portion is adapted to sense a value of an angle of rotation of the linkage pin with respect to the linkage pin housing.

16. A sensor assembly, as set forth in claim 15, wherein the inner portion of the sensor assembly further includes an adapter plate adapted to connect the second coupling member to the first portion of the rotary position sensor.

17. A sensor assembly, as set forth in claim 13, wherein the outer portion of the sensor assembly further includes a plurality of o-rings adapted to seal the inner portion of the sensor assembly from the external environment.

18. A sensor assembly, as set forth in claim 13, further including a circular floating seal disk located around the perimeter of the linkage pin adapter and between the inner portion and the outer portion of the sensor assembly, the floating seal disk being adapted to allow the linkage pin adapter to move in a radial direction with respect to the longitudinal axis in response to radial motion of the linkage pin.

19. A sensor assembly, as set forth in claim 18, wherein the flexible first coupling member is adapted to flex in response to radial movements of the linkage pin adapter and responsively prevent the radial movements from being transferred to the rotary position sensor, the first coupling member also being adapted to prevent axial movements of the linkage pin from being transferred to the rotary position sensor.

20. A sensor assembly, as set forth in claim 19, further including a circular bearing located around the perimeter of the second coupling member between the inner portion and the outer portion of the sensor assembly, the bearing being adapted to prevent radial and axial movement of the second coupling member and the rotary position sensor.

21. A sensor assembly, as set forth in claim 13, further including a plurality of rubber isolation mounts at locations of attachment of the second coupling member to the rotary position sensor and of the rotary position sensor to the outer portion of the sensor assembly, the isolation mounts being adapted to isolate the rotary position sensor from shocks and vibrations.

22. An apparatus for mounting a rotary position sensor to a linkage pin housing and a linkage pin, the linkage pin being rotatably positioned within the linkage pin housing, comprising:

a sensor housing adapted to mount to the linkage pin housing;

a linkage pin adapter located along a longitudinal axis within the sensor housing and having a first end adapted to mount to the linkage pin, the linkage pin adapter being adapted to rotate within the sensor housing as a function of a rotation of the linkage pin;

a first coupling member connected to a second end of the linkage pin adapter at a center portion along the longitudinal axis, the first coupling member being flexible and having a general cup shape extending away from the linkage pin adapter;

a second coupling member connected to the first coupling member;

an adapter plate connecting the second coupling member to the rotary position sensor;

a circular floating seal disk located around the perimeter of the linkage pin adapter;

a circular bearing located around the perimeter of the second coupling member; and a plurality of rubber isolation mounts at locations of attachment of the second coupling member to the rotary position sensor and of the rotary position sensor to the sensor housing;

wherein the flexible first coupling member, the floating seal disk, the bearing, and the isolation mounts are adapted to prevent shocks, vibrations, and radial and axial movements of the linkage pin from being transferred to the rotary position sensor.

* * * * *